Figure 1:
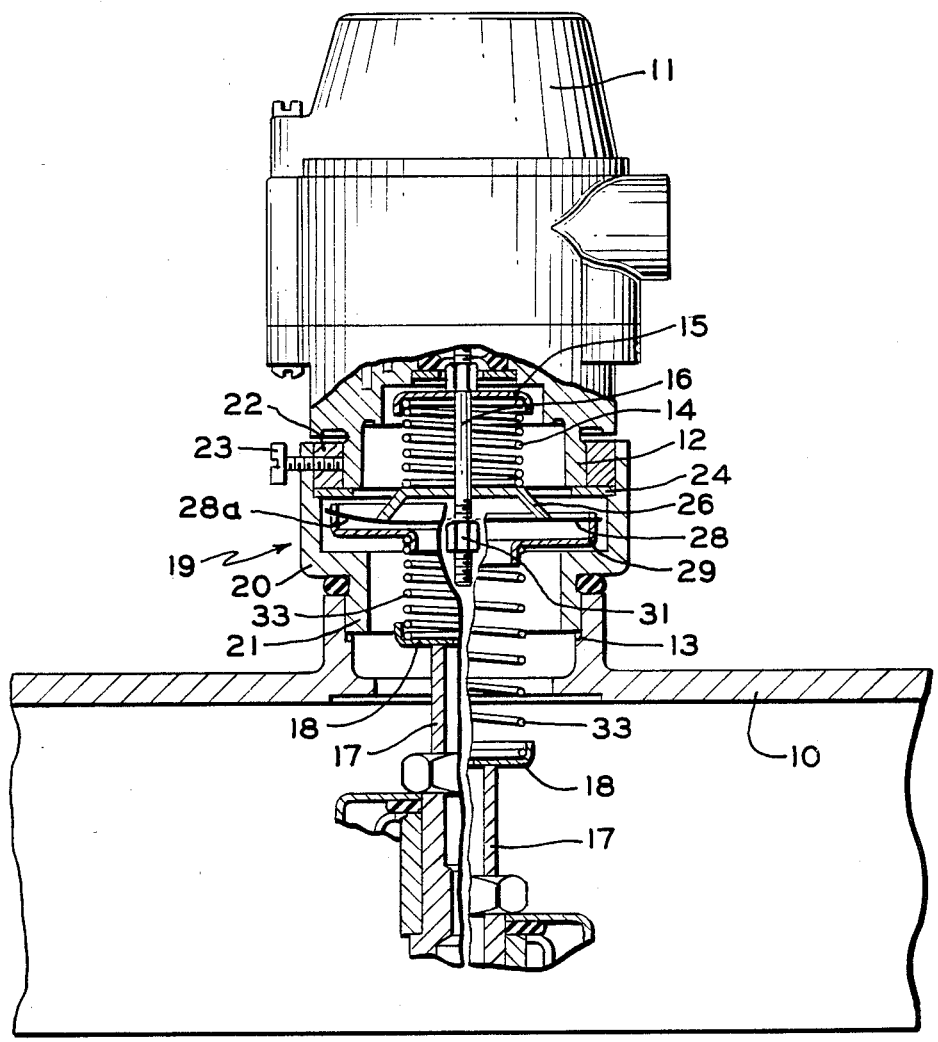

United States Patent [19]

Hary

[11] Patent Number: 4,583,447
[45] Date of Patent: Apr. 22, 1986

[54] PNEUMATIC DIAPHRAGM ACTUATOR WITH A PNEUMATIC POSITION CONTROLLER

[75] Inventor: Günter Hary, Rodenbach, Fed. Rep. of Germany

[73] Assignee: Honeywell GmbH, Offenbach, Fed. Rep. of Germany

[21] Appl. No.: 139,955

[22] Filed: Apr. 14, 1980

[51] Int. Cl.⁴ .............................................. F01B 31/00
[52] U.S. Cl. ............................................. 92/7; 92/59; 92/84; 92/94
[58] Field of Search .................... 92/7, 84, 94, 128, 59; 137/269, 271

[56] References Cited

U.S. PATENT DOCUMENTS

| 2,376,348 | 5/1945 | Fox | 92/7 |
|---|---|---|---|
| 2,527,814 | 10/1950 | Hanssen | 92/59 |
| 2,536,435 | 1/1951 | Fox | 92/7 |
| 2,583,502 | 1/1952 | Wiggins | 92/7 |
| 3,253,610 | 5/1966 | Pahl | 92/59 |
| 3,683,954 | 8/1972 | Press | 137/269 |
| 3,937,244 | 2/1976 | Bible | 137/269 |

FOREIGN PATENT DOCUMENTS

| 1082472 | 5/1960 | Fed. Rep. of Germany | 92/59 |
|---|---|---|---|
| 1926886 | 12/1970 | Fed. Rep. of Germany | 137/269 |

*Primary Examiner*—Abraham Hershkovitz
*Attorney, Agent, or Firm*—Trevor B. Joike

[57] ABSTRACT

Pneumatic diaphragm actuator having a driving rod for acting upon a push rod of a position controller through a return spring, wherein an inversion device when inserted between the diaphragm actuator and the position controller, inverts the force exerted upon the push rod by the driving rod.

14 Claims, 4 Drawing Figures

PNEUMATIC DIAPHRAGM ACTUATOR WITH A PNEUMATIC POSITION CONTROLLER

The present invention relates to a pneumatic diaphragm actuator with a pneumatic position controller.

It is known to have a bracket arranged between a pneumatic diaphragm actuator and a pneumatic position controller whereat, depending on the operating mode of the pneumatic diaphragm actuator, the pneumatic position controller is arranged coaxially to the diaphragm actuator or is offset with respect to the axis of the actuator. With a direct acting diaphragm actuator the position controller is coaxially arranged with respect to the actuator and the driving connection between a driving rod of the actuator and an actuating push rod of the position controller is such that with an upward displacement of the driving rod an upwardly directed force is exerted on the actuating push rod. With a reverse acting diaphragm actuator the position controller is laterally offset with respect to the axis of the diaphragm actuator and an upward displacement of the driving rod of the diaphragm actuator is changed to a force acting downward on the actuating push rod of the position controller by means of an interconnected lever pivotally mounted at its mid-point. Accordingly in both operating modes the position controller is arranged at different positions on said bracket.

Departing from the known design, it is the object of the present invention to achieve a device arranged between the diaphragm actuator and the position controller for allowing the position controller to be mounted always in the same geometrical position with respect to the diaphragm actuator. The solution of said object is achieved by the invention characterized in claim 1. Further advantageous embodiments of the invention may be taken from the subclaims.

Figure 2:
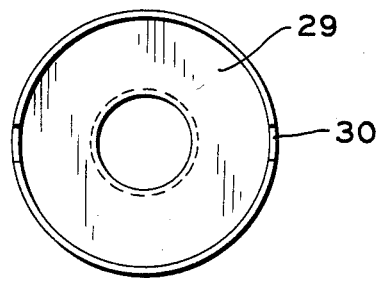
Figure 3:
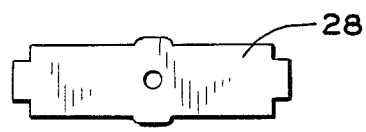
Figure 4:
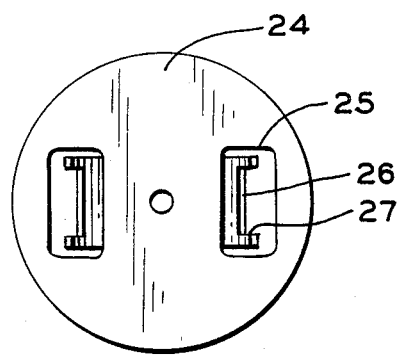

An embodiment of the inventive arrangement is shown in detail in the following drawing figures:

FIG. 1.—Parts of a pneumatic diaphragm actuator with a pneumatic position controller mounted to it and with an inventive reversion device connected between actuator and controller when said actuator is reversely operated; and, FIGS. 2 to 4—Individual design elements of the reversion device according to FIG. 1.

According to FIG. 1 a pneumatic position controller 11 of the known design is mounted on the housing of a pneumatic diaphragm actuator 10. The position controller 11 in a known manner has to achieve the object of bringing the position of a regulator piston actuated by the diaphragm actuator into accordance with the pressure provided by a controller.

In a direct operation mode the position controller with its externally threaded stud 12 is threaded in an opening 13 having an internal thread provided in the cover of the diaphragm actuator 10. A return spring 14 is biased between a spring cap 15 connected to the push rod 16 of the position controller 11 and a spring cap 18 abutting against the driving rod 17 of the diaphragm actuator 10.

With the pneumatic diaphragm actuator 10 being reversely operated the same position controller 11 without being laterally offset may be used if an inversion device 19 is inserted between the diaphragm actuator 10 and the position controller 11. The inversion device or reversing mechanism 19 comprises a cup-shaped support 20 which is threaded by means of an externally threaded stud 21 into the internally threaded opening 13 of the diaphragm actuator 10, wherein the stud 21 of the support 20 has the same diameter as the stud 12 of the position controller 11. A diameter reducing ring 22 is inserted into the support 20. The ring 22 preferably is fixed in the support 20 by means of three screws 23 (only one of which is shown) uniformly spaced around the circumference. The screws 23 grip, through aligned threaded bores, and at the same time secure the position controller 11 in the ring 22 by being tightened against the externally threaded stud 12.

Against the ring 22 abuts from below a circular bearing plate 24 which is shown in FIG. 4 in a plan view from the underside. By punching-out holes 25 and bending-off the remaining blades 26 by 45° two knife-edge suspensions for a force reversion spring 28 are formed, the spring being shown in greater detail in FIG. 3. The reversion spring 28 is guided hereby in recesses 27 in the blades 26.

A cup-shaped bowl 29 shown in greater detail in FIG. 2 comprises at its upper rim two diametrically arranged recesses 30 into which the ends of reversion spring 28 are inserted. Accordingly the reversion spring abuts against the bowl 29, the blades 26, the bearing plate 24 and against the push rod 16 wherein said last abutment is formed by a nut 31 threaded on the push rod 16 against the reversion spring 28, push rod 16 being inserted through corresponding holes in bearing plate 24 and reversion spring 28.

A stroke spring 33 is arranged between the spring cap 18 and the underside of the bowl 29. The stroke spring 33 is dimensioned in such a way that the device comprising the bowl 29, the reversion spring 28 and the bearing plate 24 is kept abutting the ring 22. At the same time under these circumstances the return spring 14 is fully biased.

As easily can be seen from FIG. 1, in the direct operation mode, an upward displacement of the driving rod of the pneumatic diaphragm actuator 10 exerts an upwardly directed force on the push rod 16 by means of the return spring 14, but in the event of a reversely operated diaphragm actuator 10, the reversion device 19 is used to change the upward displacement of the driving rod of the pneumatic diaphragm actuator to a downwardly directed force on the actuating push rod 16. This reversing operation is accomplished by the more and more compressed stroke spring 33 which by means of the bowl 29 takes along in an upward direction the arms of the reversion spring 28. Hereby, the reversion spring 28 tends to bend around the knife-edge suspensions 26 as shown by the left half 28a of the reversion spring in FIG. 1. Since the reversion spring 28 at its center point abuts against the nut 31, a downward directed force is exerted upon the push rod 16 of the position controller 11.

By dimensioning the spring rates of the return spring 14 and of the stroke spring 33 as well as by choosing the leverage with respect to the reversion spring 28, a 1:1 relationship for the force with a reversion of the direction is achievable in the reverse mode. The fact that from the travel stroke of the stroke spring 33 the travel stroke of the reversion spring 28 is subtracted may be taken into consideration by also dimensioning appropriately the leverages.

The principle of the reversion spring as above described may also be integrated in other embodiments of a pneumatic position controller.

I claim:

1. A pneumatic diaphragm actuator with a pneumatic position controller, wherein a displaceable driving rod of the diaphragm actuator by means of a return spring acts upon a push rod of the position controller and a force inversion device between the diaphragm actuator and the position controller in a reverse operation mode inverts the force acting upon the push rod, characterized in that the device for inversion of the force at its one side is adapted to receive the position controller and at its other side is inserted in a mounting means of the diaphragm actuator adapted to receive the position controller in a direct operation mode.

2. The arrangement according to claim 1 characterized in that the force inversion device is coaxially arranged with respect to the diaphragm actuator and the position controller.

3. The arrangement according to claim 2 characterized in that, in addition to a return spring, a stroke spring is arranged abutting against the driving rod of the diaphragm actuator and a force reversion spring is arranged extending diametrically and abutting at its center against the push rod, at its outer ends against the stroke spring and at intermediate points against knife-edge suspensions against a return spring.

4. The arrangement according to claim 3 characterized in that the return spring abuts against a bearing plate forming, with bended-off blades, said knife-edge suspensions for the force reversion spring.

5. The arrangement according to claim 3 characterized in that the stroke spring abuts against a cup-shaped bowl with the force reversion spring abutting in recesses against the upper rim of said bowl.

6. The arrangement according to claim 4 characterized in that the bearing plate abuts with its upper face against a ring reduced in diameter and receiving the position controller.

7. The arrangement according to claim 6 characterized in that said ring is arranged in a support which is threaded with an external threaded stud into a threaded opening of the diaphragm actuator.

8. The arrangement according to claim 7 characterized in that the device comprising the bearing plate, the force reversion spring and the bowl is mounted between said ring and a shoulder of said support.

9. The arrangement according to claim 3 characterized in that the force reversion spring is formed by a nut threaded on said push rod.

10. A device for connection between a pneumatic diaphragm actuator and a pneumatic position controller, said pneumatic diaphragm actuator having a driving rod and said pneumatic position controller having a push rod, said device reversing the action between said pneumatic diaphragm actuator and said pneumatic position controller, said device comprising:

a support having actuator attachment means for attaching said support to said pneumatic diaphragm actuator and controller attachment means for attaching said support to said pneumatic position controller, said actuator attachment means and said controller attachments means being arranged for allowing the same relative position that said pneumatic diaphragm actuator and said pneumatic position controller have when said pneumatic diaphragm actuator is mounted directly to said pneumatic position controller; and, reverse acting means within said support for reversing the action of said pneumatic diaphragm actuator upon said pneumatic position controller.

11. The device of claim 10 wherein said actuator attachment means and said controller attachment means are arranged such that said driving rod and said push rod are coaxial when said pneumatic diaphragm actuator and said pneumatic position controller are mounted to said support.

12. The device of claim 11 wherein said support further includes a stroke spring arranged to abut against the driving rod of the pneumatic diaphragm actuator and a force reversion spring arranged to extend diametrically and to abut at its center and on a first side against the push rod of said pneumatic position controller.

13. The device of claim 12 wherein said support further includes a bearing plate having a hole therein through which said push rod can extend, said bearing plate having depending portions abutting against a second side of said force reversion spring.

14. The device of claim 13 wherein said support means further includes a bowl having means for abutting against outer ends of said force reversion spring and having further means abutting against a second end of said stroke spring.

* * * * *